United States Patent
Raduta

(10) Patent No.: US 10,846,831 B2
(45) Date of Patent: Nov. 24, 2020

(54) COMPUTING SYSTEM FOR RECTIFYING ULTRA-WIDE FISHEYE LENS IMAGES

(71) Applicant: GM GLOBAL TECHNOLOGY OPERATIONS LLC, Detroit, MI (US)

(72) Inventor: Radu Raduta, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 133 days.

(21) Appl. No.: 16/225,760

(22) Filed: Dec. 19, 2018

(65) Prior Publication Data
US 2020/0202498 A1 Jun. 25, 2020

(51) Int. Cl.
*G06T 5/00* (2006.01)
*G06T 5/50* (2006.01)
*G05D 1/02* (2020.01)

(52) U.S. Cl.
CPC ........... *G06T 5/006* (2013.01); *G05D 1/0221* (2013.01); *G05D 1/0231* (2013.01); *G06T 5/50* (2013.01); *G05D 2201/0213* (2013.01)

(58) Field of Classification Search
CPC ......... G06T 5/006; G06T 5/50; G05D 1/0231; G05D 1/0221; G05D 2201/0213
See application file for complete search history.

(56) References Cited

U.S. PATENT DOCUMENTS

| | | |
|---|---|---|
| 7,184,609 B2 | 2/2007 | Liu et al. |
| 7,336,299 B2 | 2/2008 | Kostrzewski et al. |
| 2008/0101713 A1 | 5/2008 | Edgar |
| 2013/0258047 A1* | 10/2013 | Morimoto ............... G06T 5/006 348/36 |
| 2014/0104424 A1* | 4/2014 | Zhang ................ H04N 5/23238 348/148 |
| 2017/0309034 A1* | 10/2017 | Mueller ................... G06T 5/006 |
| 2019/0102868 A1* | 4/2019 | Beric ..................... G06T 3/0018 |
| 2019/0130540 A1* | 5/2019 | Ding ..................... G06T 3/0062 |

(Continued)

FOREIGN PATENT DOCUMENTS

WO 2010087989 A1 8/2010

OTHER PUBLICATIONS

Flexible architecture Fisheye Correction Automotive Rear View Camera (2008) (Year: 2008).*

*Primary Examiner* — Nizar N Sivji
(74) *Attorney, Agent, or Firm* — Medley, Behrens & Lewis, LLC

(57) ABSTRACT

Various technologies described herein pertain to rectification of a fisheye image. A computing system receives the fisheye image. Responsive to receiving the fisheye image, the computing system applies a first lookup function to a first portion of the fisheye image to mitigate spatial distortions of the fisheye image. The computing system also applies a second lookup function to a second portion of the fisheye image to mitigate the spatial distortions. The first lookup function maps first pixels in the first portion to a first rectilinear image corresponding to the first portion when viewed from a first perspective of a first virtual camera. The second lookup function maps second pixels in the second portion to a second rectilinear image corresponding to the second portion when viewed from a second perspective of a second virtual camera. The computing system then outputs the first rectilinear image and the second rectilinear image.

20 Claims, 13 Drawing Sheets

(56) References Cited

U.S. PATENT DOCUMENTS

2019/0260928 A1\* 8/2019 Kunishige ............. G06T 3/0018
2020/0020075 A1\* 1/2020 Khwaja .................. G06T 5/002
2020/0117918 A1\* 4/2020 Wallin ...................... G06T 7/70

\* cited by examiner

COMPUTING SYSTEM FOR RECTIFYING ULTRA-WIDE FISHEYE LENS IMAGES

BACKGROUND

A fisheye lens is an ultra-wide-angle lens that, when used in a camera, creates a wide panoramic or hemispherical image (a "fisheye image"). For instance, an exemplary fisheye lens may have a field of view ranging from 100 to 360°. Thus, fisheye lenses are able to capture images with greater fields of view when compared to rectilinear lenses, which tend to have fields of view that are less than 100°.

Fisheye images produced by fisheye lenses include significant spatial distortions (e.g., barrel distortions). For instance, objects in a central region of a fisheye image may appear warped and enlarged relative to their actual appearance and objects in peripheral regions of the fisheye image may appear compressed relative to their actual appearance. As a result, unlike a rectilinear image, objects (or portions of objects) that are straight in their actual appearance do not appear straight in the fisheye image.

As fisheye lenses have a wide field of view, autonomous vehicles may utilize cameras with fisheye lenses in order to perceive objects in their surroundings. An autonomous vehicle is a motorized vehicle that can operate without a human driver. An exemplary autonomous vehicle includes a plurality of sensor systems, such as but not limited to, a lidar sensor system, a camera sensor system, and a radar sensor system, amongst others. The autonomous vehicle operates based upon sensor signals output by the sensor systems.

Rectification is a process by which spatial distortions may be removed from a fisheye image such that the image appears rectilinear (or nearly rectilinear). Conventional computer-implemented rectification techniques tend to be associated with a loss of (image) data at either a central region of the fisheye image or a peripheral region of the fisheye image. Three-dimensional rendering techniques may also be employed in order to rectify a fisheye image. However, three-dimensional rendering techniques tend to require physics simulations of an environment and hence are computationally intensive.

SUMMARY

The following is a brief summary of subject matter that is described in greater detail herein. This summary is not intended to be limiting as to the scope of the claims.

Described herein are various technologies that pertain to rectifying a fisheye image. More specifically, described herein is a computer-implemented technique for outputting a first rectilinear image and a second rectilinear image from the fisheye image by applying a first lookup function and a second lookup function to the fisheye image. The first rectilinear image and/or the second rectilinear image may then be presented on a display or may be provided as input to a computer-implemented machine learning model.

In operation, a computing device receives a fisheye image captured via a fisheye lens of a fisheye camera. The fisheye camera captures a wide field of view (e.g., 100 to 360°) and as a result the fisheye image includes spatial distortions. For instance, an object in the fisheye image may appear curved when the object is straight in its actual appearance. In an example, a first object in a central region of the fisheye image may appear enlarged relative to a first actual size of the first object in an environment and a second object in a peripheral region of the fisheye image may appear compressed relative to an actual size of the second object in the environment.

Responsive to receiving the fisheye image, the computing device applies a first lookup function to a first portion of the fisheye image in order to mitigate the spatial distortions. The first lookup function maps first pixels in the first portion to a first rectilinear image and is generated based upon parameters of the fisheye lens that captured the fisheye image. The first rectilinear image corresponds to a first portion of the fisheye image when viewed from a perspective of a first virtual camera.

The computing device also applies a second lookup function to a second portion of the fisheye image in order to mitigate the spatial distortions. The second portion may overlap in part with the first portion. The second lookup function maps second pixels in the second portion to a second rectilinear image and is generated based upon the parameters of the fisheye lens that captured the fisheye image. The second rectilinear image corresponds to a second portion of the fisheye image when viewed from a perspective of a second virtual camera.

The computing device then outputs the first rectilinear image and the second rectilinear image. For instance, the computing device may present the first rectilinear image and the second rectilinear image on a display or the computing device may provide the first rectilinear image and the second rectilinear image as input to a computer-implemented machine learning model.

In an embodiment, the above-described process may be performed by an autonomous vehicle. The autonomous vehicle comprises the fisheye camera, a vehicle propulsion system, a braking system, and a steering system. The autonomous vehicle further comprises a computing system that is in communication with the fisheye camera, the vehicle propulsion system, the braking system, and the steering system. Similar to the process described above, the computing system of the autonomous vehicle applies the first lookup function and the second lookup function to the first portion of the fisheye image and the second portion of the fisheye image, respectively, in order to generate the first rectilinear image and the second rectilinear image. The computing system then provides the first rectilinear image and the second rectilinear image as input to a computer-implemented machine learning model. The machine learning model outputs an indication of a maneuver (e.g., a left-turn, maintaining a straight heading, a right-turn, etc.) that is to be performed by the autonomous vehicle based upon the first rectilinear image and the second rectilinear image. The computing system then controls at least one of the vehicle propulsion system, the braking system, or the steering system to cause the autonomous vehicle to execute the maneuver.

The above-described technologies present various advantages over conventional technologies for rectifying fisheye images. First, through use of selecting a region of interest less than a full field of view, the above-described technologies enable rectification of a fisheye image without a loss of data at a central region or a peripheral region of the fisheye image. This is advantageous in an autonomous vehicle context where a fuller view of a driving environment of the autonomous vehicle is desirable. Second, the above described technologies require less computational resources when compared to three-dimensional rendering techniques as rendering does not need to be performed by a computing device.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
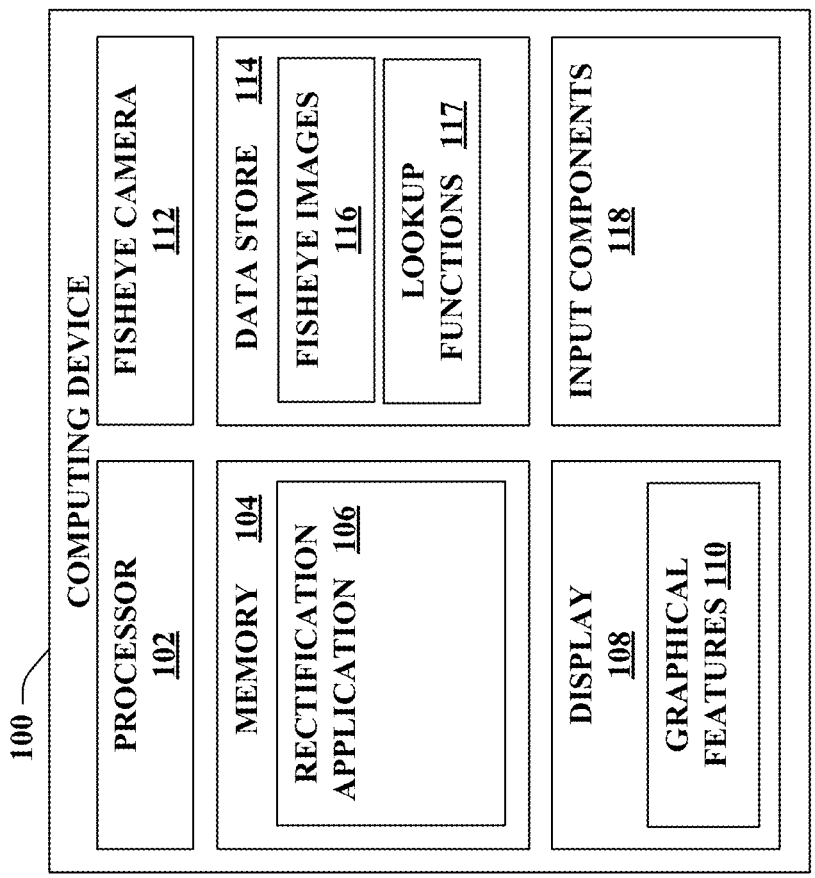
FIG. 1 illustrates a functional block diagram of an exemplary computing device.

Various technologies pertaining to rectification of fisheye images, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

As used herein, the term "fisheye image" refers to an image captured via a fisheye lens of a fisheye camera. The fisheye lens may have a field of view ranging from 100 to 360°. As such, the fisheye image captures a field of view surrounding the fisheye lens that ranges from 100 to 360°. For instance, the field of view may range from 110 to 350°, from 150 to 300°, or from 180 to 200°. Put another way, a "fisheye image" may refer to an image in which visual features appearing as curved in the image correspond to straight features in an environment captured by the fisheye image. The term "fisheye image" is meant to include, but is not limited to, images captured via a circular fisheye lens and/or images captured via a full-frame fisheye lens.

As used herein, the term "rectilinear image" refers to an image in which visual features appearing as straight in the image correspond to straight features in the environment captured by the rectilinear image.

Referring now to the drawings, FIG. 1 illustrates an exemplary computing device 100. The computing device 100 comprises a processor 102 and memory 104, wherein the memory 104 has a rectification application 106 loaded therein. As will be described in greater detail below, the rectification application 106 (when executed by the processor 102) is configured to rectify fisheye images.

In an embodiment, the computing device 100 may include a display 108, whereupon graphical features 110 may be presented thereon. For instance, fisheye images and rectilinear images may be presented as part of the graphical features 110. In an embodiment, the display 108 may be a touchscreen.

In an embodiment, the computing device 100 may include a fisheye camera 112. The fisheye camera 112 comprises a fisheye lens and is configured to capture fisheye images of surroundings of the computing device 100.

In an embodiment, the computing device 100 may include a data store 114. The data store 114 may store fisheye images 116 (as well as other images). For instance, the fisheye images 116 may include fisheye images captured by the fisheye camera 112, as well as other fisheye images transmitted to the computing device 100 by other computing devices.

The data store 114 may also include lookup functions 117. As will be described in greater detail below, the lookup functions 117 are configured to enable rectification of a fisheye image captured via a fisheye lens of a fisheye camera. In an example, the lookup functions 117 may include a first lookup function and a second lookup function. Although not depicted in FIG. 1, the lookup functions 117 may also be retained in the memory 104.

In an embodiment, the computing device 100 may include input components 118. The input components 118 may include a mouse, a keyboard, a touchscreen, a trackpad, a scroll wheel, a stylus, a camera other than the fisheye camera 112, a video camera, etc.

Operation of the computing device 100 is now set forth. Prior to receiving a fisheye image captured via a fisheye camera, the rectification application 106 (or another application executing on another computing device) generates the first lookup function and the second lookup function based upon parameters (e.g., focal length, maximum aperture, etc.) of a fisheye lens of the fisheye camera (e.g., the fisheye camera 112). The first lookup function is assigned to a first portion of the fisheye lens of the fisheye camera (and hence a first portion of a fisheye image captured by the fisheye lens). More specifically, the first portion may correspond to a first subset of pixels captured by the fisheye camera. The first lookup function corresponds to a first perspective of a first virtual camera. The second lookup function is assigned to a second portion of the fisheye lens of the fisheye camera (and hence a second portion of a fisheye image captured by the fisheye lens). More specifically, the second portion may correspond to a second subset of pixels captured by the fisheye camera. The second lookup function corresponds to a second perspective of a second virtual camera. In an embodiment, the first lookup function and the second lookup function may be implemented as tables that may be stored in the memory 104 and/or the data store 114.

The computing device 100 then receives a fisheye image captured via the fisheye camera 112 (or another fisheye camera). The fisheye image includes spatial distortions. For instance, an object in the fisheye image may appear curved when the object is straight in its actual appearance. More specifically, a first object in a central region of the fisheye image may appear enlarged relative to a first actual size of the first object in an environment and a second object in a peripheral region of the fisheye image may appear compressed relative to an actual size of the second object in the environment.

In an embodiment where the computing device 100 comprises the fisheye camera 112, the computing device 100 controls the fisheye camera 112 such that the fisheye camera 112 captures the fisheye image. In another embodiment, the computing device 100 may receive the image from another computing device that is in network communication with the computing device 100.

Responsive to receiving the fisheye image, the rectification application 106 applies a first lookup function to a first portion of the fisheye image to mitigate the spatial distortions. The first lookup function maps first pixels in the first portion to a first rectilinear image. The first rectilinear image corresponds to the first portion of the fisheye image when viewed from a perspective of a first virtual camera. The rectification application 106 also applies a second lookup function to a second portion of the fisheye image to mitigate the spatial distortions. The second lookup function maps second pixels in the second portion to a second rectilinear image. The second rectilinear image corresponds to the second portion of the fisheye image when viewed from a second perspective of a second virtual camera. The first portion and the second portion may overlap in part.

The rectification application 106 then outputs the first rectilinear image and the second rectilinear image. The rectification application 106 may cause the first rectilinear image and/or the second rectilinear image to be stored in the data store 114. In a first embodiment, the rectification application 106 may cause the first rectilinear image and the second rectilinear image to be presented on the display 108 as part of the graphical features 110. In a second embodiment, the rectification application 106 may cause the first rectilinear image and the second rectilinear image to be presented on the display 108 as part of a video stream. In a third embodiment, the rectification application 106 may be configured to present the (original) fisheye image on the display 108. The rectification application 106 may present a selection area (e.g., a rectangle) as an overlay to the fisheye image. The computing device 100 may receive input from a user causing the selection area to be moved across different portions of the fisheye image. When the selection area is placed over the first portion of the fisheye image, the first rectilinear image may be displayed within the fisheye image as an overlay to the fisheye image. When the selection area is placed over the second portion of the fisheye image, the second rectilinear image may be displayed within the fisheye image as an overall to the fisheye image.

In a fourth embodiment, the rectification application 106 may cause the first rectilinear image and the second rectilinear image to be provided as input to a computer-implemented machine learning model (not shown). For instance, the machine learning model may be configured to classify objects in the first rectilinear image and/or the second rectilinear image.

Figure 2:
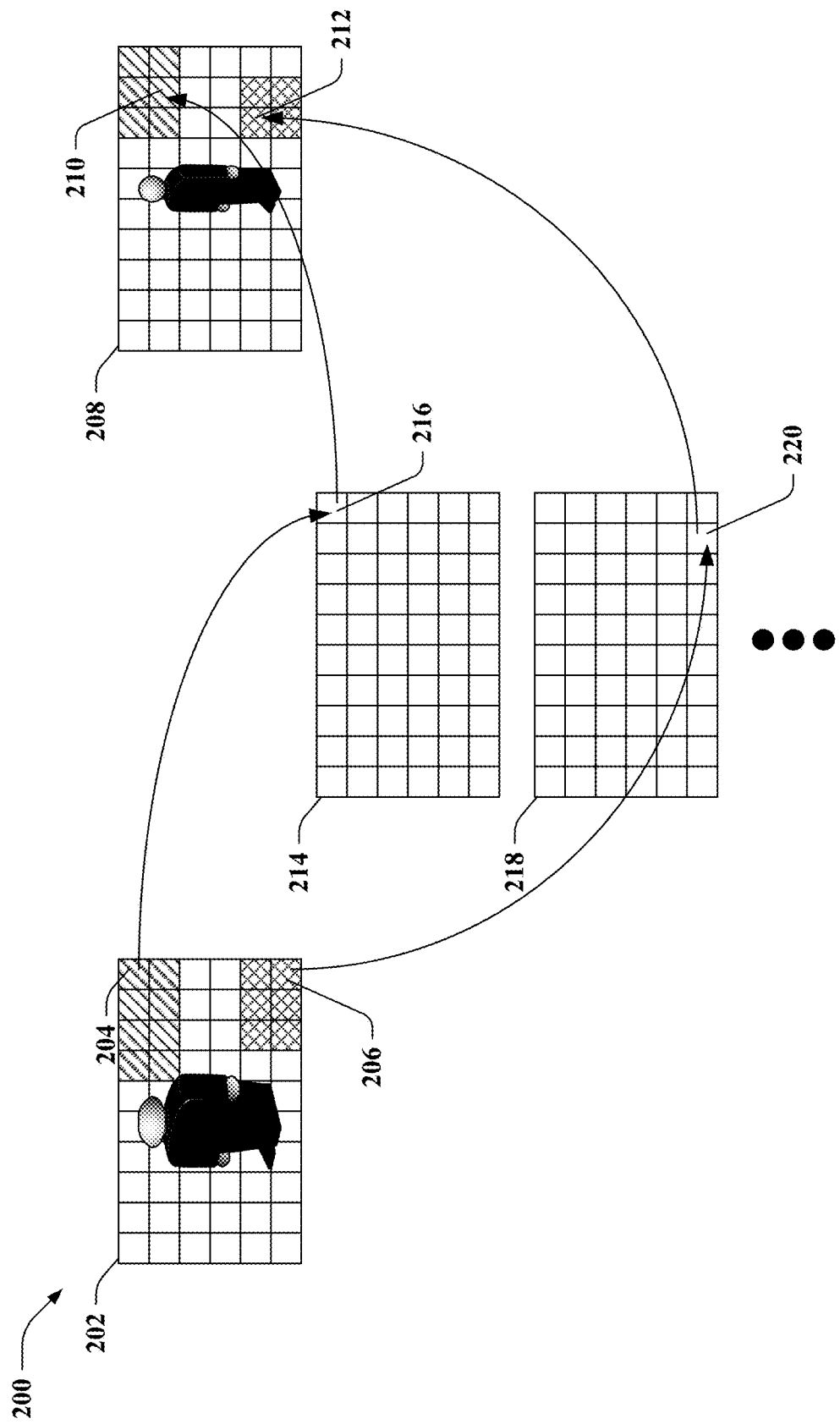
FIG. 2 illustrates a view of a mapping of a fisheye image to a rectilinear image.

Turning now to FIG. 2, a view 200 of rectification mappings is illustrated. The view 200 includes a fisheye image 202 that has been captured by a fisheye lens of a fisheye camera (e.g., the fisheye camera 112). The fisheye image 202 comprises pixels (represented as squares in FIG. 2). For instance, the fisheye image 202 may include a first pixel 204 and a second pixel 206. The first pixel 204 may be in a first portion of the fisheye image 202 (indicated by diagonal lines in FIG. 2) and the second pixel 206 may be in a second portion of the fisheye image 202 (indicated by cross-hatched lines in FIG. 2).

The view 200 also includes a rectilinear representation 208 that is generated from the fisheye image 202. The rectilinear representation 208 comprises pixels (represented as squares in FIG. 2). For instance, the rectilinear representation 208 may include a third pixel 210 and a fourth pixel 212. It is to be understood that the fisheye image 202 and the rectilinear representation 208 may have different dimensions.

The view 200 further includes a first lookup table 214 and a second lookup table 218. The first lookup table 214 may be assigned to the first portion of the fisheye image 202 (indicated by the diagonal lines) and the second lookup table 218 may be assigned to the second portion of the fisheye image 202 (indicated by the cross-hatched lines). In an embodiment, the first lookup function described above may be implemented as the first lookup table 214 and the second lookup function described above may be implemented as the second lookup table 218.

Entries of the first lookup table 214 map pixels in the first portion of the fisheye image 202 to pixels in the rectilinear representation 208 (or vice versa). For instance, the first lookup table 214 may include a first entry 216 that maps the first pixel 204 of the fisheye image 202 to the third pixel 210 of the rectilinear representation 208. Alternatively, the first entry 216 may map the third pixel 210 of the rectilinear representation 208 to the first pixel 204 of the fisheye image 202. The rectification application 106 (or the rectification application 406 described below) may utilize the first lookup table 214 in order to generate rectilinear images. For instance, the area of the rectilinear representation 208 filled with diagonal lines may correspond to a first rectilinear image corresponding to the first portion of the fisheye image 202 when viewed from a perspective of a first virtual camera.

Entries of the second lookup table 218 map pixels in the second portion of the fisheye image 202 to pixels in the rectilinear representation 208 (or vice versa). For instance, the second lookup table 218 may include a second entry 220 that maps the second pixel 206 of the fisheye image 202 to the fourth pixel 212 of the rectilinear representation 208. Alternatively, the second entry 220 may map the fourth pixel 212 of the rectilinear representation 208 to the second pixel 206 of the fisheye image 202. The rectification application 106 (or the rectification application 406 described below) may utilize the second lookup table 218 in order to generate rectilinear images. For instance, the area of the rectilinear representation 208 filled with cross-hatched lines may correspond to a second rectilinear image corresponding to the second portion of the fisheye image 202 when viewed from a perspective of a second virtual camera.

Although the view 200 is depicted as having a first lookup table 214 and a second lookup table 218, it is to be understood that the rectification application 106 described above (and the rectification application 406 described below) may utilize many different lookup tables assigned to many different portions of the fisheye image 202 in order to generate rectilinear images.

The number and location of pixels in FIG. 2 are presented for illustrative purposes only. It is contemplated that the fisheye image 202 and the rectilinear representation 208 may include more or less pixels than is illustrated in FIG. 2 and that the first portion and the second portion may have different dimensions and be located in different regions of the fisheye image 202.

Figure 3:
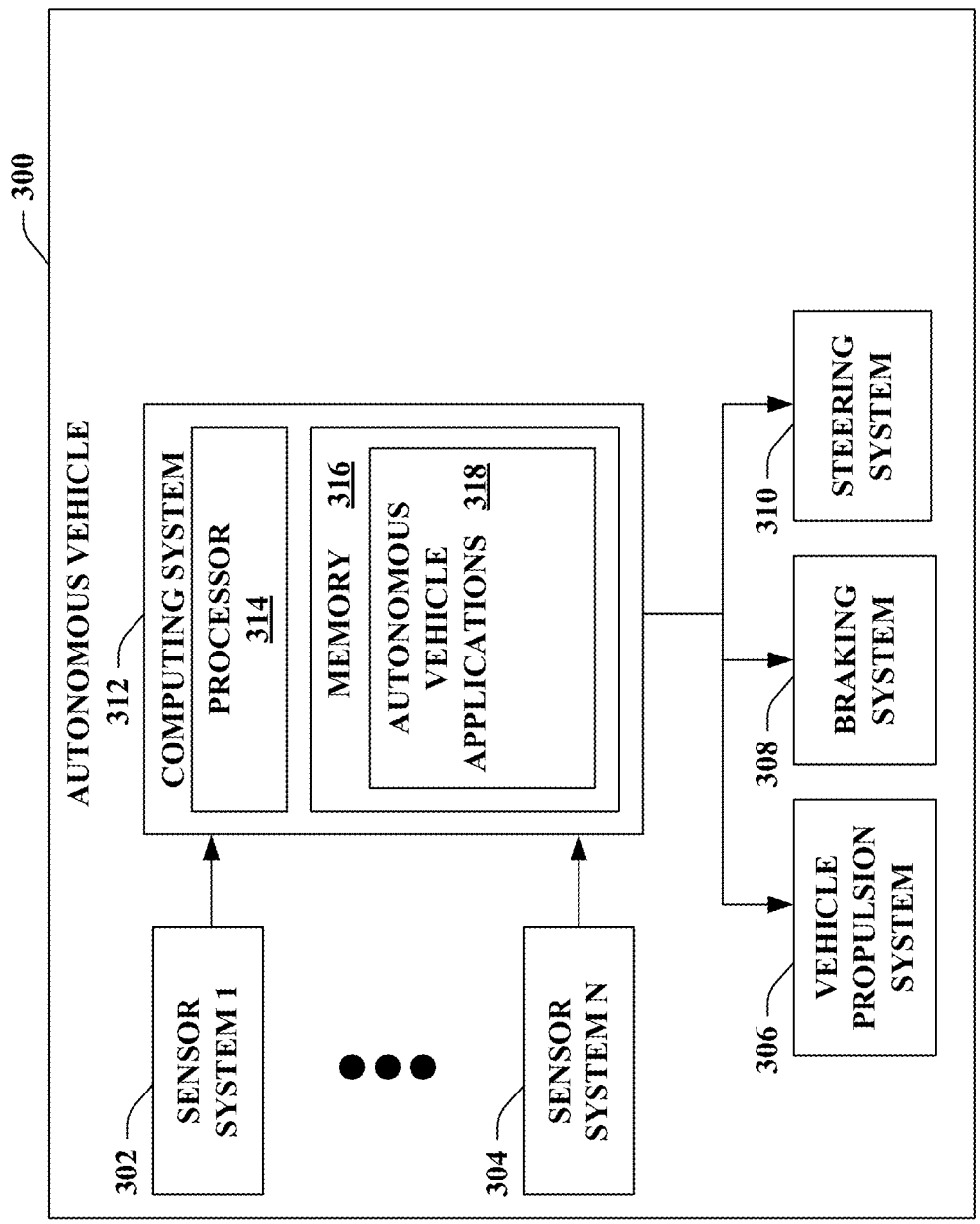
FIG. 3 illustrates a functional block diagram of an exemplary autonomous vehicle.

With reference to FIG. 3, an autonomous vehicle 300 is illustrated. The autonomous vehicle 300 can navigate about roadways without human conduction based upon sensor signals outputted by sensor systems of the autonomous vehicle 300. The autonomous vehicle 300 includes a plurality of sensor systems, namely, a sensor system 1 302, . . . , and a sensor system N 304, where N can be substantially any integer greater than 1 (collectively referred to herein as sensor systems 302-304). The sensor systems 302-304 are of different types and are arranged about the autonomous vehicle 300. For example, the sensor system 1 302 may be a lidar sensor system and the sensor system N 304 may be a camera sensor (image) system. Other exemplary sensor systems included in the sensor systems 302-304 can include radar sensor systems, GPS sensor systems, sonar sensor systems, infrared sensor systems, and the like.

The autonomous vehicle 300 further includes several mechanical systems 306-310 that are used to effectuate appropriate motion of the autonomous vehicle 300. For instance, the mechanical systems 306-310 can include, but are not limited to, a vehicle propulsion system 306, a braking system 308, and a steering system 310. The vehicle propulsion system 306 may be an electric motor, an internal combustion engine, or a combination thereof. The braking system 308 can include an engine brake, brake pads, actuators, and/or any other suitable componentry that is configured to assist in decelerating the autonomous vehicle 300. The steering system 310 includes suitable componentry that is configured to control the direction of movement of the autonomous vehicle 300.

The autonomous vehicle 300 additionally includes a computing system 312. The computing system 312 includes a processor 314 and memory 316, wherein the memory 316 has one or more autonomous vehicle applications 318 loaded therein. In general, the one or more autonomous vehicle applications 318 (when executed by the processor 314) are configured to facilitate operation of the autonomous vehicle 300. For instance, the one or more autonomous vehicle application 318 may be configured with functionality pertaining to navigation of the autonomous vehicle 300, passenger pickup, etc. The autonomous vehicle 300 may also include a data store (not shown), whereupon data may be retained.

Figure 4:
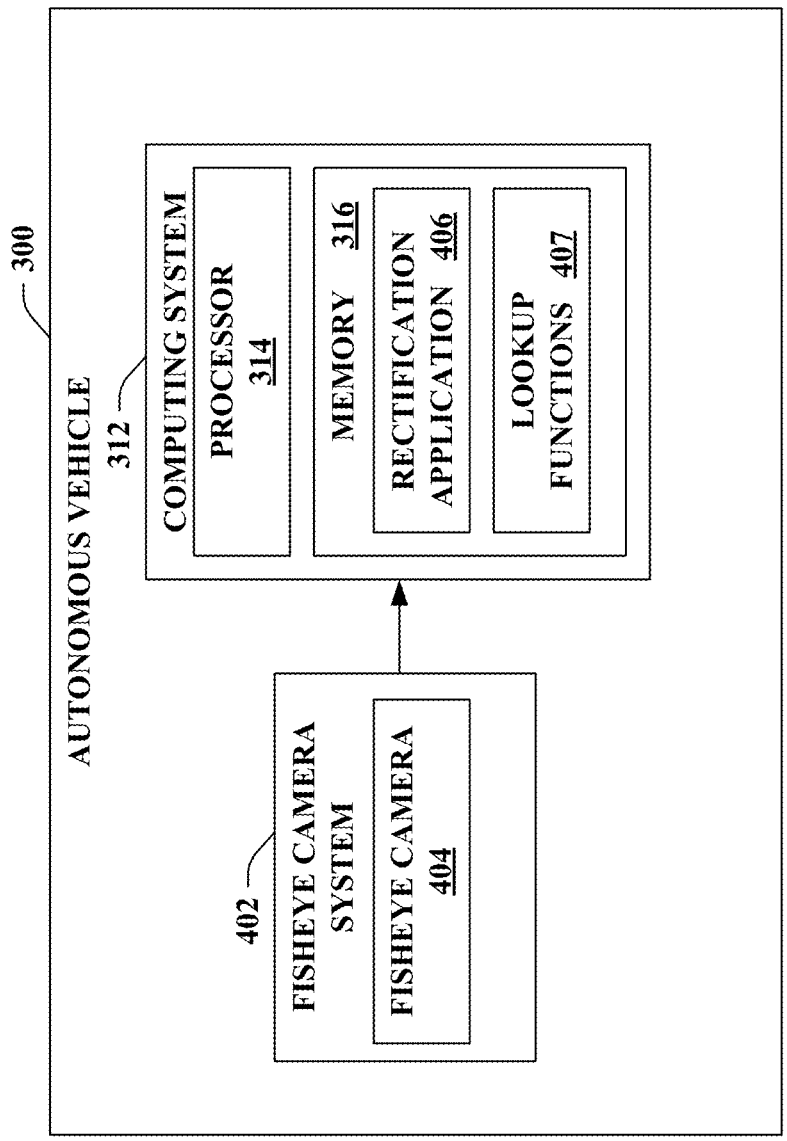
FIG. 4 illustrates a functional block diagram of an exemplary autonomous vehicle.

Referring now to FIG. 4, the autonomous vehicle 300 according to various embodiments is illustrated. Again, the autonomous vehicle 300 includes the plurality of sensor systems 302-304, the computing system 312 (including the processor 314, the memory 316, and the one or more autonomous vehicle applications 318), and the mechanical systems 306-310 (not shown).

As depicted in FIG. 4, the autonomous vehicle 300 further comprises a fisheye camera system 402. The fisheye camera system 402 may be included in the plurality of sensor systems 302-304. The fisheye camera system 402 comprises a fisheye camera 404. As described above, the fisheye camera 404 has a fisheye lens that is configured to capture a field of view ranging from 100 to 360°.

As depicted in FIG. 4, the autonomous vehicle 300 additionally comprises a rectification application 406. As will be described in greater detail below, the rectification application 406 (when executed by the processor 314) is generally configured to rectify a fisheye image. More specifically, the rectification application 406 is configured to generate multiple rectilinear images, wherein the multiple rectilinear images correspond to perspectives of different virtual cameras. The rectification application 406 may be part of a perception stack of the autonomous vehicle 300, wherein the perception stack is configured to enable the autonomous vehicle 300 to perceive a driving environment surrounding the autonomous vehicle 300.

As depicted in FIG. 4, the memory 316 may include lookup functions 407. As will be described in greater detail below, the lookup functions 407 are configured to enable rectification of a fisheye image captured via the fisheye lens of the fisheye camera 404. In an example, the lookup functions 407 may include a first lookup function and a second lookup function. Although not depicted in FIG. 4, the lookup functions 117 may also be retained a data store (not shown) of the autonomous vehicle 300.

Figure 5:
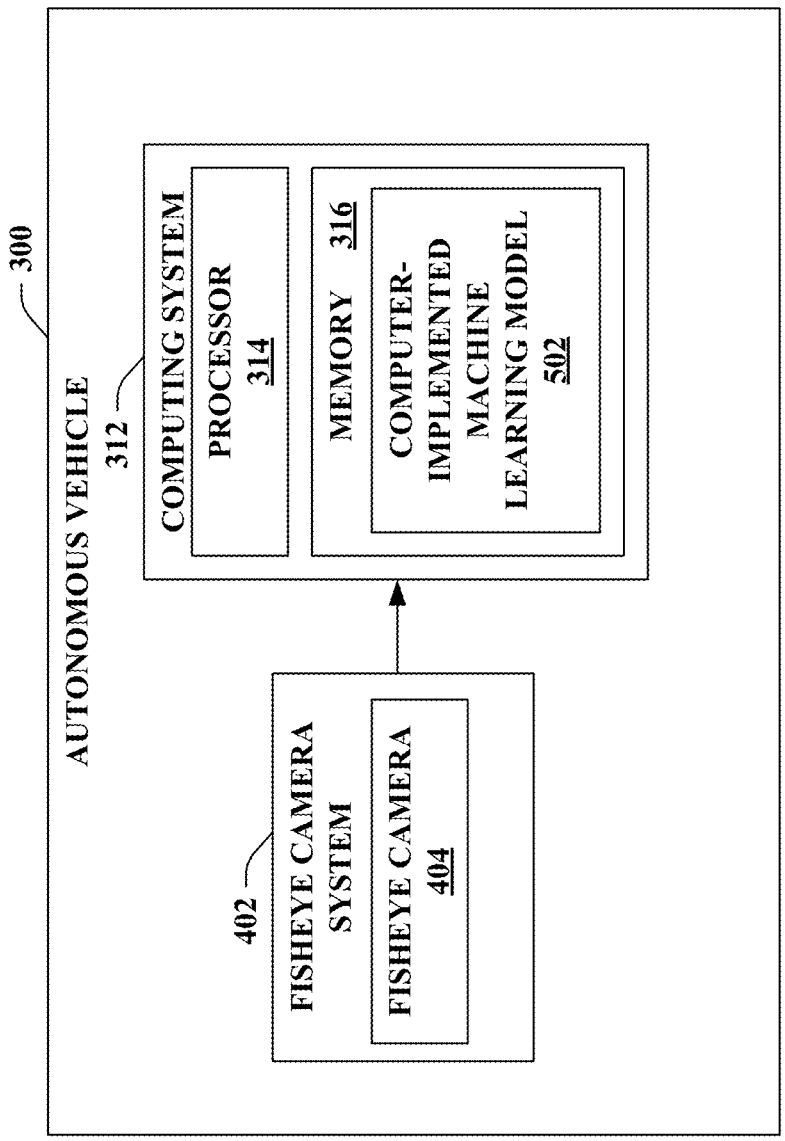
FIG. 5 illustrates a functional block diagram of an exemplary autonomous vehicle.

Referring now to FIG. 5, the autonomous vehicle 300 according to various embodiments is illustrated. Again, the autonomous vehicle 300 includes the plurality of sensor systems 302-304, the computing system 312 (including the processor 314, the memory 316, and the one or more autonomous vehicle applications 318), and the mechanical systems 306-310 (not shown).

As depicted in FIG. 5, the autonomous vehicle 300 further comprises a computer-implemented machine learning model 502. As will be described in greater detail below, the machine learning model 502 is configured to identify a maneuver (e.g., right turn, left turn, maintain a straight heading, brake, yield, etc.) that the autonomous vehicle 300 is to execute based upon one or more rectilinear images generated from a fisheye image captured by the fisheye camera 404. Alternatively, the machine learning model 502 may be configured to classify an object in a rectilinear image. For instance, the machine learning model 502 may classify an object in a rectilinear image as a pedestrian, a bike, a car, a truck, a bus, or a static object (e.g., a tree).

In an embodiment, the machine learning model 502 may be or include a deep neural network (DNN), a recurrent neural network (RNN), a long short-term memory (LSTM) RNN, an artificial neural network (ANN), etc. In another embodiment, the machine learning model 502 may be or include a support vector machine (SVM), a naïve Bayes classifier, or other suitable classifier.

In an example, when the machine learning model 502 comprises nodes and edges, each edge is assigned a learned weight, wherein the weight can be learned using a supervised, semi-supervised, or unsupervised learning procedure. The autonomous vehicle 300 may provide at least one rectilinear image to the machine learning model 502 as input, and the machine learning model 502 may identify a maneuver that the autonomous vehicle 300 is to execute based upon the at least one rectilinear image and the weights assigned to the edges. In another example, the autonomous vehicle 300 may provide at least one rectilinear image to the machine learning model 502 as input, and the machine learning model 502 may classify objects in the image based upon the at least one rectilinear image and the weights assigned to the edges.

Although FIG. 5 depicts the memory 316 as retaining a single machine learning model, it is to be understood that the memory 316 may retain many different machine learning models. The machine learning models may also be retained in a data store (not shown) of the autonomous vehicle 300. Furthermore, the autonomous vehicle 300 may provide rectilinear images generated from fisheye images to the many different machine learning models in order to identify a maneuver that the autonomous vehicle 300 is to execute and/or classify objects in the images.

Referring generally now to FIGS. 3-5, operation of the autonomous vehicle 300 is now set forth. It is contemplated that the autonomous vehicle 300 is operating in a driving environment. Prior to operating in the driving environment, a first lookup function and a second lookup function are generated based upon parameters of a fisheye lens of the fisheye camera 404 of the autonomous vehicle 300. As the autonomous vehicle 300 operates, the fisheye lens of the fisheye camera 404 captures a fisheye image of the driving environment. The fisheye image includes spatial distortions (described above in the description of FIG. 1). The computing system 312 of the autonomous vehicle 300 then receives the fisheye image.

Responsive to receiving the fisheye image, the rectification application 406 applies the first lookup function to a first portion of the fisheye image in order to mitigate the spatial distortions. In an embodiment, the first lookup function may be implemented as a first lookup table. The first lookup function maps first pixels in the first portion of the fisheye image to a first rectilinear image. The first lookup function may correspond to a first perspective of a first virtual camera in a driving environment of the autonomous vehicle 300. Moreover, the first rectilinear image corresponds to the first portion of the fisheye image when viewed from a first perspective of a first virtual camera in the driving environment of the autonomous vehicle 300.

Responsive to receiving the fisheye image, the rectification application 406 also applies the second lookup function to a second portion of the fisheye image in order to mitigate the spatial distortions. The second portion of the fisheye image may overlap in part with the first portion of the fisheye image. In an embodiment, the second lookup function may be implemented as a second lookup table. The second lookup function maps second pixels in the second portion of the fisheye image to a second rectilinear image. The second lookup function may correspond to a second perspective of a second virtual camera in the driving environment of the autonomous vehicle 300. The second rectilinear image corresponds to the second portion of the fisheye image when viewed from a second perspective of a second virtual camera in the driving environment of the autonomous vehicle 300.

The rectification application 406 then outputs the first rectilinear image and the second rectilinear image. For instance, the rectification application 406 may provide the first rectilinear image and the second rectilinear image as input to the machine learning model 502. The machine learning model 502 may identify a maneuver that the autonomous vehicle 300 is to execute based upon at least one of the first rectilinear image and the second rectilinear image. For instance, the maneuver may be a left turn, maintaining a straight heading, a right turn, yielding, changing to a lane left of a current lane of the autonomous vehicle 300, changing to a lane right of the current lane of the autonomous vehicle 300, a U-turn, etc. The computing system 312 may then control at least one of the vehicle propulsion system 306, the braking system 308, or the steering system 310 in order to cause the autonomous vehicle 300 to execute the maneuver.

Alternatively, the machine learning model 502 may classify one or more objects in the first rectilinear image and/or the second rectilinear image. For instance, the machine learning model 502 may classify the one or more objects as a pedestrian, a bike, a car, a truck, a bus, or a static object (e.g., a tree). The computing system 312 of the autonomous vehicle 300 may then control at least one of the vehicle propulsion system 306, the braking system 308, or the steering system 310 to execute a maneuver based upon the classification of the one or more objects in the first rectilinear image and/or the second rectilinear image.

Although the above-described processes have been described above as being performed by the rectification application 106 or the rectification application 406, it is to be understood that some or all of the above-described processes may be implemented in hardware, such as in a Field-programmable Gate Array (FPGA) or in an Application-specific integrated Circuit (ASIC). As such, some or all of the above-described processes may also be integrated into the fisheye camera 112 and/or the fisheye camera 404.

Although the above-described processes have described as rectifying a first portion of a fisheye image and a second portion of the fisheye image by generating a first rectilinear image and a second rectilinear image, it is to be understood that many portions of the fisheye image may be rectified, and hence many rectilinear images may be generated using the above described processes. Thus, the above-described processes many generate many different virtual camera views.

Figure 6:
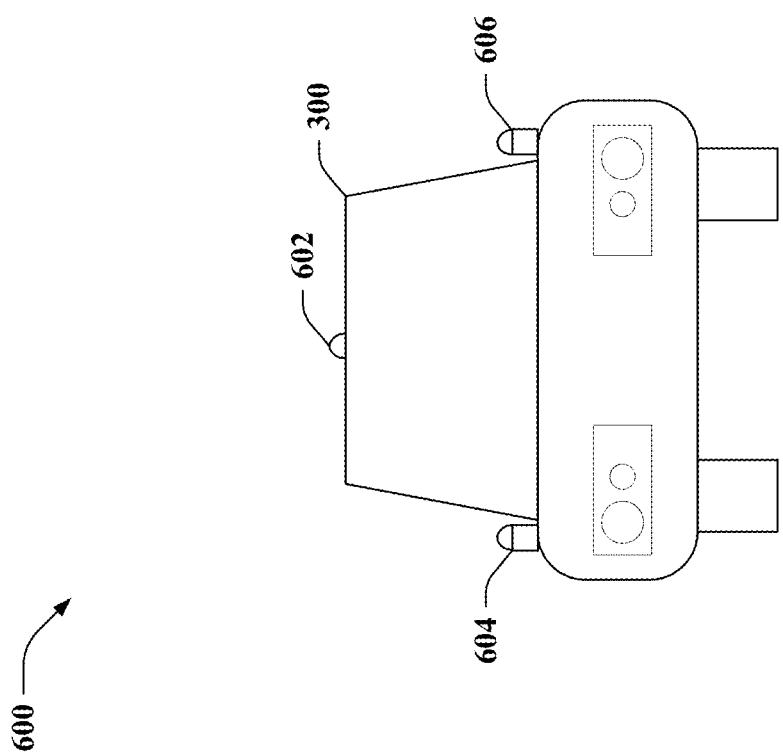
FIG. 6 illustrates placement of fisheye cameras on an autonomous vehicle.

Turning now to FIG. 6, a front view 600 of an exemplary placement of fisheye cameras on the autonomous vehicle 300 is illustrated. As depicted in FIG. 3, the autonomous vehicle 300 may have a fisheye camera 602 placed on a roof the autonomous vehicle 300. The autonomous vehicle 300 may also have a fisheye camera 604 placed on a left side of the autonomous vehicle 300 and a fisheye camera 606 placed on a right side of the autonomous vehicle 300. The fisheye cameras 602-606 may be or include the fisheye camera 404 and the fisheye camera 404 may be or include the fisheye cameras 602-606. Although FIG. 6 depicts placement of three fisheye cameras on the autonomous vehicle 300, it is to be understood that the autonomous vehicle 300 may have more (or less) than three fisheye cameras.

Figure 7:
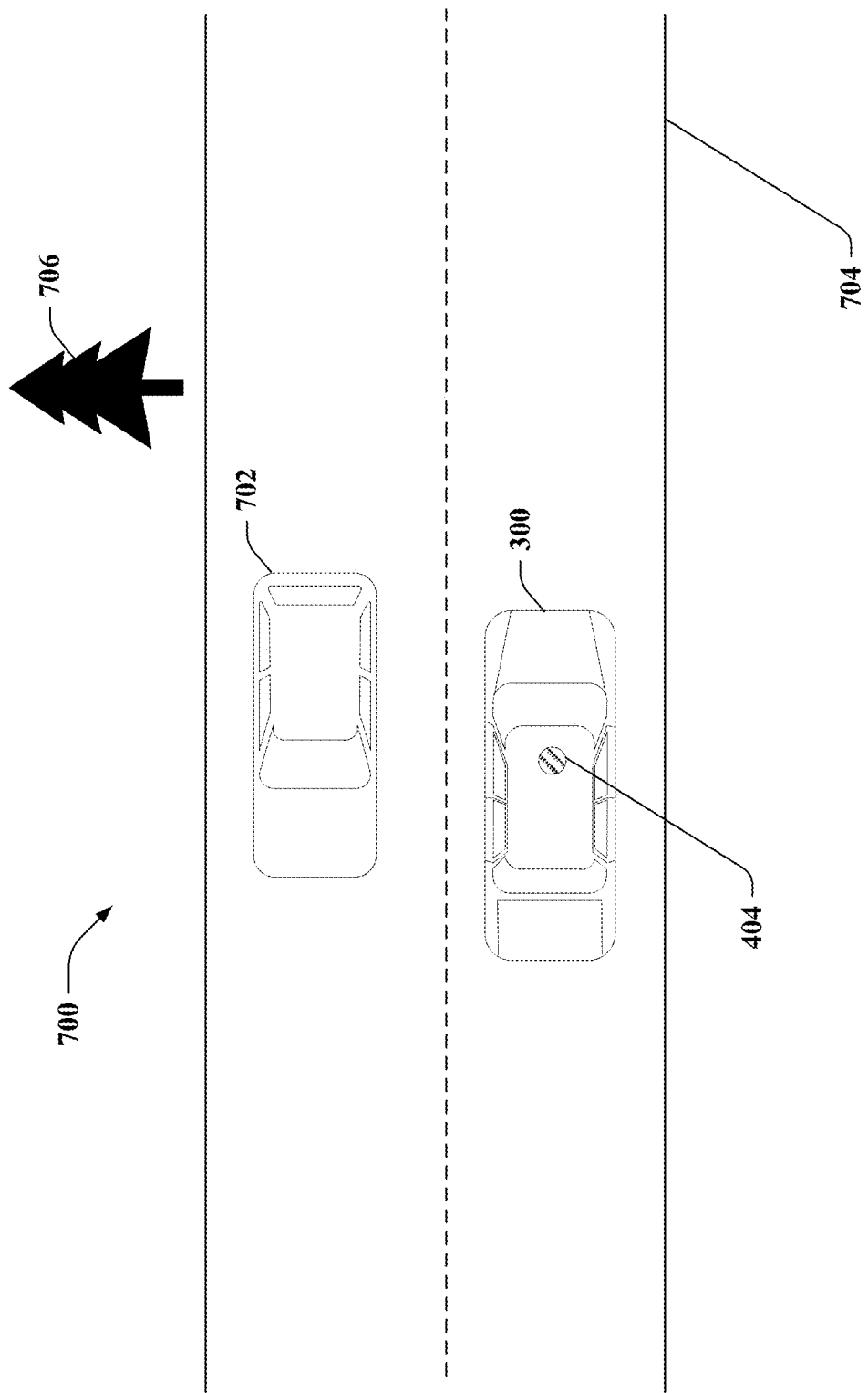
FIG. 7 illustrates a driving environment of an autonomous vehicle.

With reference to FIG. 7, a top-down view of a driving environment 700 is illustrated. The driving environment 700 includes the autonomous vehicle 300, a vehicle 702 (i.e., a first object), a road 704 on which the autonomous vehicle 300 and the vehicle 702 operate, and a tree 706 (i.e., a second object). The autonomous vehicle 300 includes the fisheye camera 404 as described above. The vehicle 702 and the tree 706 are within a field of view of the fisheye camera 404.

Figure 8:
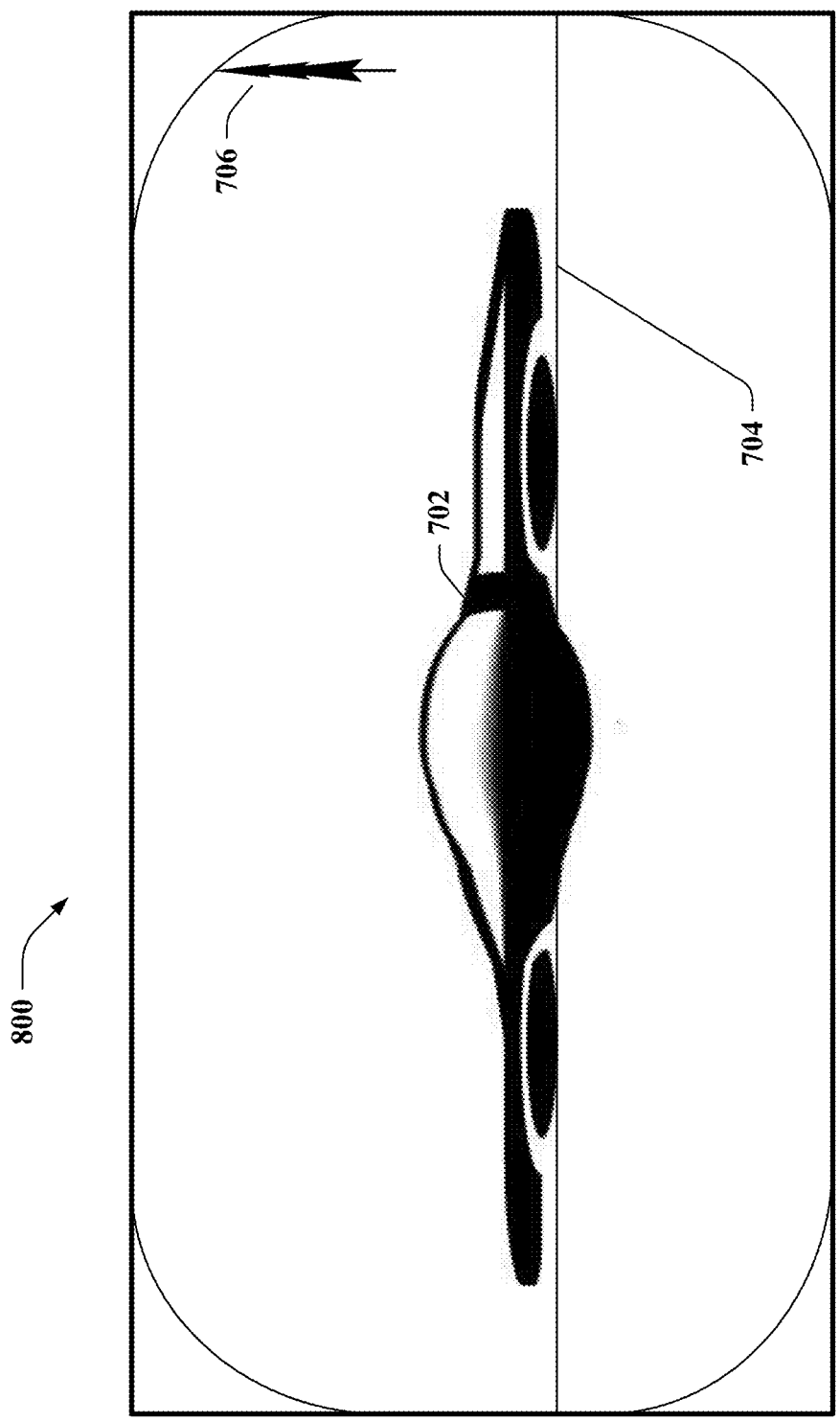
FIG. 8 illustrates a fisheye image.

Turning now to FIG. 8, a fisheye image 800 captured by the fisheye camera 404 of the autonomous vehicle 300 is illustrated. The fisheye image 800 includes the vehicle 702, the road 704 of which the vehicle 702 operates, and the tree 706 located in the driving environment 700. As the fisheye image 800 was captured via the fisheye camera 404, the fisheye image includes spatial distortions. For instance, as the vehicle 702 is located in a central region of the fisheye image 800, the vehicle 702 appears warped and enlarged in the fisheye image 800 relative to actual dimensions of the vehicle 702 in the driving environment 700. Additionally, as the tree 706 is located in a peripheral region of the fisheye image 800, the tree 706 appears compressed relative to actual dimensions of the tree 706 in the driving environment 700.

Figure 9:
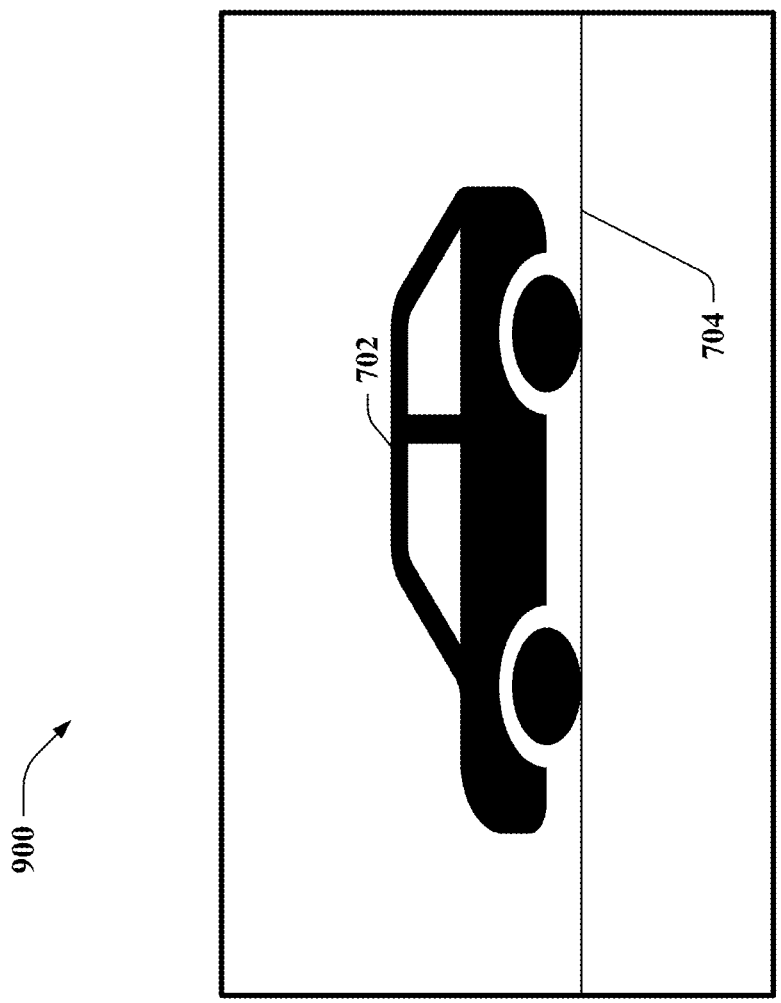
FIG. 9 illustrates a rectilinear image generated from the fisheye image illustrated in FIG. 8.

Referring now to FIG. 9, a rectilinear image 900 of the vehicle 702 is illustrated. The rectification application 406 (or the rectification application 106) may generate the rectilinear image 900 by applying one or more lookup functions (described above) to the fisheye image 800. The rectilinear image 900 corresponds to a first portion of the fisheye image 800 when viewed from a first perspective of a first virtual camera. In comparison to FIG. 8, the spatial distortions around the vehicle 702 and the road 704 have been mitigated.

Figure 10:
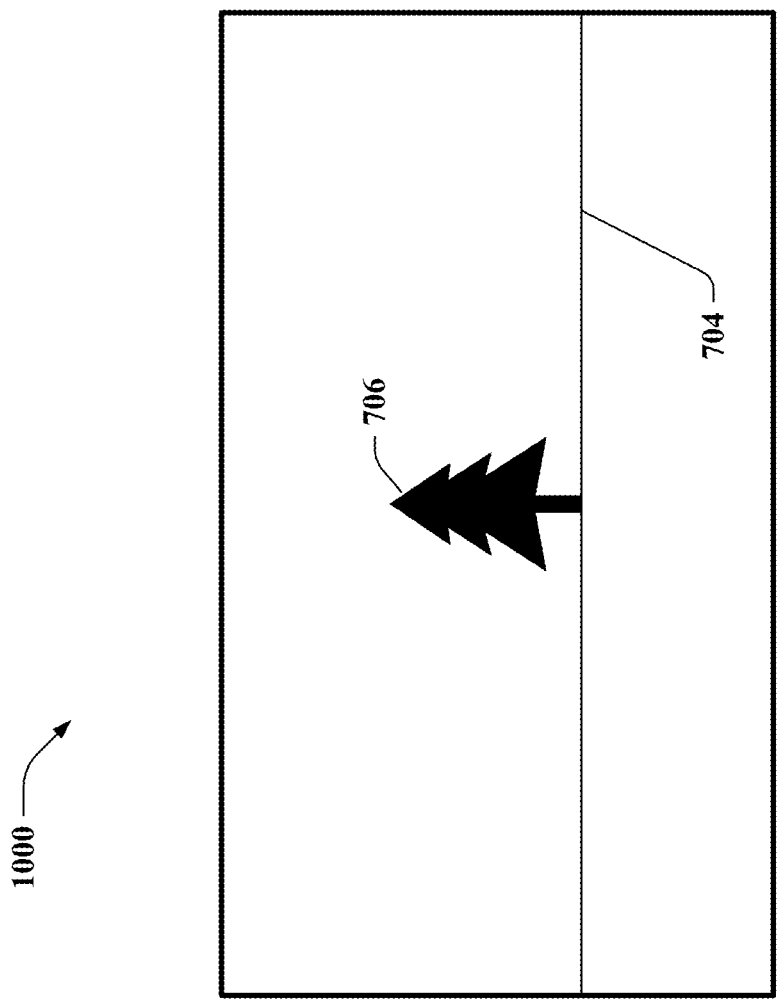
FIG. 10 illustrates another rectilinear image generated from the fisheye image illustrated in FIG. 8.

Turning now to FIG. 10, a rectilinear image 1000 of the tree 706 is illustrated. The rectification application 406 (or the rectification application 106) may generate the rectilinear image 1000 by applying one or more lookup functions (described above) to the fisheye image 800. The rectilinear image 1000 corresponds to a second portion of the fisheye image 800 when viewed from a second perspective of a second virtual camera. In comparison to FIG. 8, the spatial distortions around the tree 706 and the road 704 have been mitigated in the rectilinear image 1000 and the tree 706 no longer appears compressed.

Figure 11:
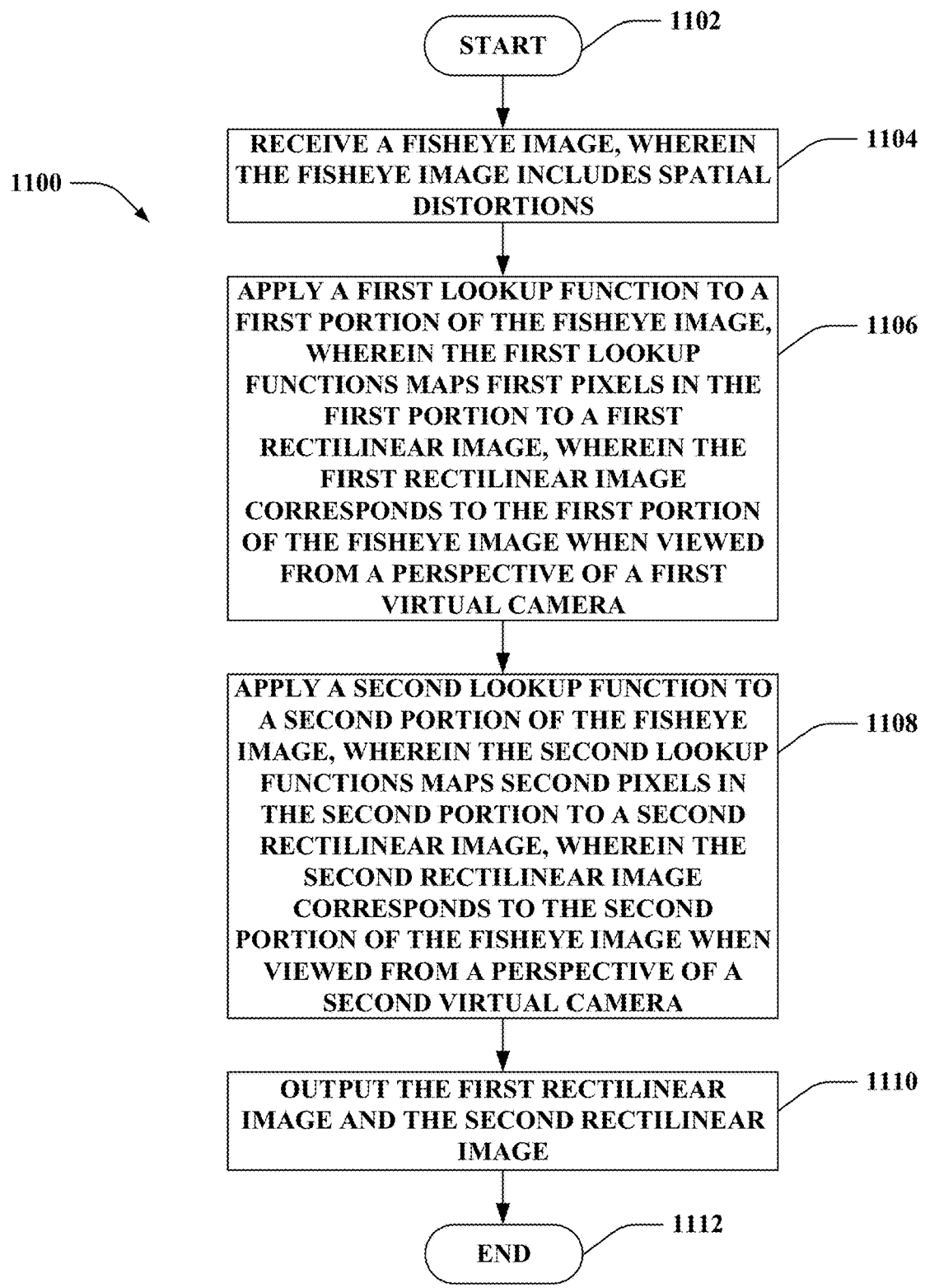
FIG. 11 is a flow diagram that illustrates an exemplary methodology performed by a computing device for rectifying a fisheye image.
Figure 12:
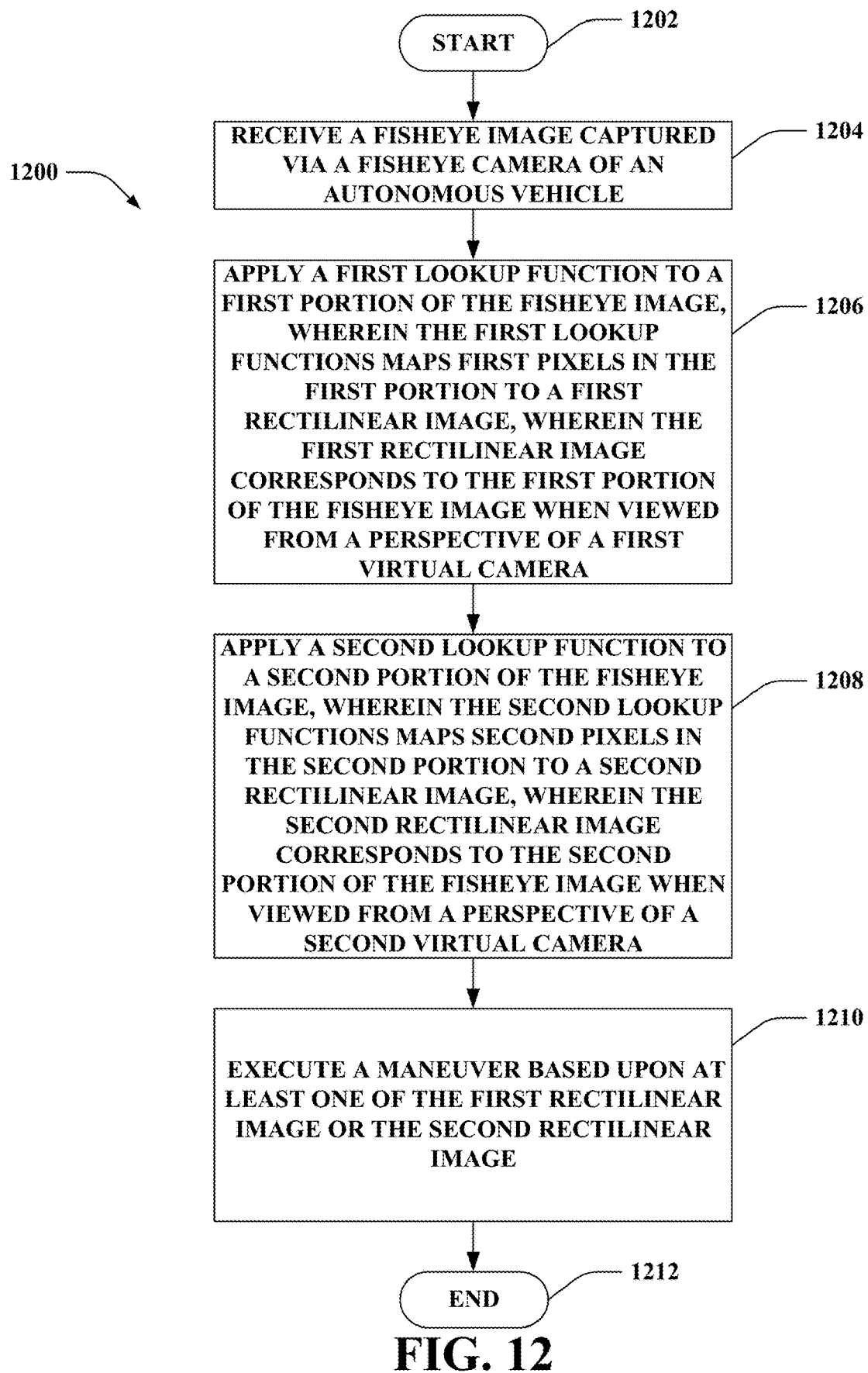
FIG. 12 is a flow diagram that illustrates an exemplary methodology performed by an autonomous vehicle for rectifying a fisheye image.

FIGS. 11 and 12 illustrate exemplary methodologies relating to rectification of a fisheye image. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference to FIG. 11, a methodology 1100 performed by a computing device for rectifying a fisheye image is illustrated. The methodology 1100 begins at 1102, and at 1104, the computing device receives a fisheye image captured via a fisheye lens of a fisheye camera. The fisheye image includes spatial distortions. At 1106, responsive to receiving the fisheye image, the computing device applies a first lookup function to a first portion of the fisheye image to mitigate the spatial distortions. The first lookup function maps first pixels in the first portion to a first rectilinear image. The first rectilinear image corresponds to the first portion of the fisheye image when viewed from a first perspective of a first virtual camera. At 1108, responsive to receiving the fisheye image, the computing device also applies a second lookup function to a second portion of the fisheye image to mitigate the spatial distortions. The second lookup function maps second pixels in the second portion to a second rectilinear image. The second rectilinear image corresponds to the second portion of the fisheye image when viewed from a second perspective of a second virtual camera. At 1110, the computing device outputs the first rectilinear image and the second rectilinear image. For instance, the computing device may output the first rectilinear image and the second rectilinear image on a display of the computing device. The methodology 1100 concludes at 1112.

Turning to FIG. 12, a methodology 1200 performed by an autonomous vehicle for rectifying a fisheye image is illustrated. The methodology 1200 begins at 1202, and at 1204 the autonomous vehicle receives a fisheye image captured via a fisheye lens of a fisheye camera comprised by the autonomous vehicle. The fisheye image includes spatial distortions. At 1206, responsive to receiving the fisheye image, the autonomous vehicle applies a first lookup function to a first portion of the fisheye image to mitigate the spatial distortions. The first lookup function maps first pixels in the first portion to a first rectilinear image. The first rectilinear image corresponds to the first portion of the fisheye image when viewed from a first perspective of a first virtual camera. At 1208, responsive to receiving the fisheye image, the autonomous vehicle also applies a second lookup function to a second portion of the fisheye image to mitigate the spatial distortions. The second lookup function maps second pixels in the second portion to a second rectilinear image. The second rectilinear image corresponds to the second portion of the fisheye image when viewed from a second perspective of a second virtual camera. At 1210, the autonomous vehicle executes a maneuver based upon at least one of the first rectilinear image or the second rectilinear image. The methodology 1200 concludes at 1212.

Figure 13:
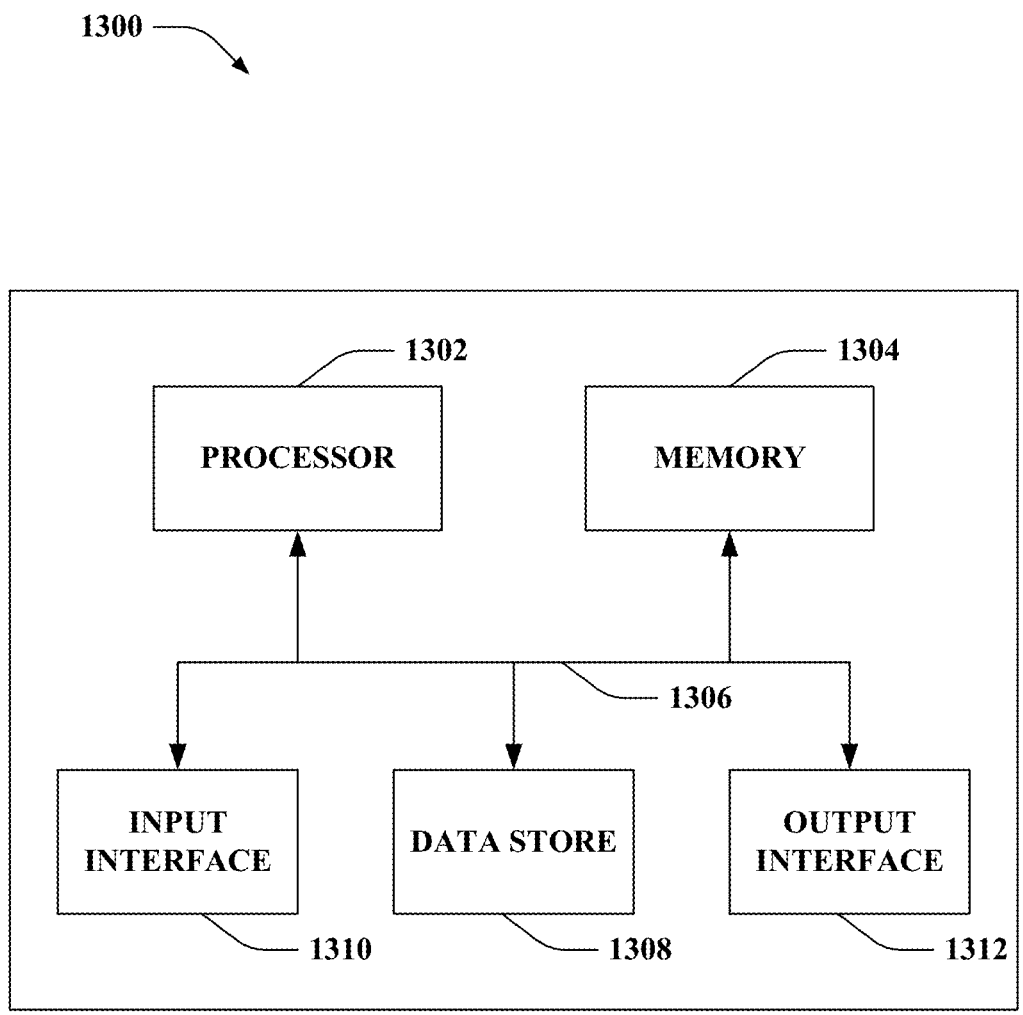
FIG. 13 illustrates an exemplary computing device.

Referring now to FIG. 13, a high-level illustration of an exemplary computing device 1300 that can be used in accordance with the systems and methodologies disclosed herein is illustrated. For instance, the computing device 1300 may be or include the computing device 100 or the computing system 312. The computing device 1300 includes at least one processor 1302 that executes instructions that are stored in a memory 1304. The instructions may be, for instance, instructions for implementing functionality described as being carried out by one or more systems discussed above or instructions for implementing one or more of the methods described above. The processor 1302 may be a graphics processing unit (GPU), a plurality of GPUs, a central processing unit (CPU), a plurality of CPUs, a multi-core processor, etc. The processor 1302 may access the memory 1304 by way of a system bus 1306. In addition to storing executable instructions, the memory 1304 may also store fisheye images, rectilinear images, lookup functions, and so forth.

The computing device 1300 additionally includes a data store 1308 that is accessible by the processor 1302 by way of the system bus 1306. The data store 1308 may include executable instructions, fisheye images, rectilinear images, lookup functions, etc. The computing device 1300 also includes an input interface 1310 that allows external devices to communicate with the computing device 1300. For instance, the input interface 1310 may be used to receive instructions from an external computer device, etc. The computing device 1300 also includes an output interface 1312 that interfaces the computing device 1300 with one or more external devices. For example, the computing device 1300 may transmit control signals to the vehicle propulsion system 306, the braking system 308, and/or the steering system 310 by way of the output interface 1312.

Additionally, while illustrated as a single system, it is to be understood that the computing device 1300 may be a distributed system. Thus, for instance, several devices may be in communication by way of a network connection and may collectively perform tasks described as being performed by the computing device 1300.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing device comprising:
   a processor; and
   memory that stores computer-readable instructions that, when executed by the processor, cause the processor to perform acts comprising:
   receiving a fisheye image captured via a fisheye lens of a fisheye camera, wherein the fisheye image includes spatial distortions;
   responsive to receiving the fisheye image:
      applying a first lookup function to a first portion of the fisheye image to mitigate the spatial distortions, wherein the first lookup function comprises a first lookup table having first entries that map first pixels in the first portion to a first rectilinear image, wherein the first rectilinear image corresponds to the first portion of the fisheye image when viewed from a first perspective of a first virtual camera;
      applying a second lookup function to a second portion of the fisheye image to mitigate the spatial distortions, wherein the second lookup function comprises a second lookup table having second entries that map second pixels in the second portion to a second rectilinear image, wherein the second rectilinear image corresponds to the second portion of the fisheye image when viewed from a second perspective of a second virtual camera; and
      outputting the first rectilinear image and the second rectilinear image.

2. The computing device of claim 1, wherein a first object is in the first portion of the fisheye image, wherein the first portion is in a central region of the fisheye image, wherein the first object in the fisheye image is enlarged relative to a first actual size of the first object in an environment, wherein a second object is in the second portion of the fisheye image, wherein the second portion is in a peripheral region of the fisheye image, wherein the second object in the fisheye image is compressed relative to a second actual size of the second object in the environment.

3. The computing device of claim 1, wherein the computing device further comprises the fisheye camera, the acts further comprising:
   prior to receiving the fisheye image, capturing the fisheye image via the fisheye lens of the fisheye camera.

4. The computing device of claim 1, wherein the computing device further comprises a display, wherein outputting the first rectilinear image and the second rectilinear image comprises presenting the first rectilinear image and the second rectilinear image on the display.

5. The computing device of claim 1, wherein a field of view of the fisheye lens ranges from 100 to 360°, wherein the fisheye image captures an area of an environment surrounding the fisheye camera that ranges from 100 to 360° with respect the fisheye camera.

6. The computing device of claim 1, wherein outputting the first rectilinear image and the second rectilinear image comprises outputting the first rectilinear image and the second rectilinear image as part of a video stream presented on a display.

7. The computing device of claim 1, the acts further comprising:

prior to receiving the fisheye image, generating the first entries of the first lookup table and the second entries of the second lookup table, wherein the first entries of the first lookup table and the second entries of the second lookup table are generated based upon parameters of the fisheye lens of the fisheye camera that captures the fisheye image, wherein the first lookup table corresponds to the first perspective of the first virtual camera, wherein the second lookup table corresponds to the second perspective of the second virtual camera.

8. An autonomous vehicle comprising:
a fisheye camera comprising a fisheye lens;
a vehicle propulsion system;
a braking system;
a steering system; and
a computing system that is in communication with the fisheye camera, the vehicle propulsion system, the braking system, and the steering system, wherein the computing system comprises:
  a processor; and
  memory that stores computer-readable instructions that, when executed by the processor, cause the processor to perform acts comprising:
    receiving a fisheye image captured via the fisheye lens of the fisheye camera, wherein the fisheye image includes spatial distortions;
    applying a first lookup function to a first portion of the fisheye image to mitigate the spatial distortions, wherein the first lookup function comprises a first lookup table having first entries that map first pixels in the first portion to a first rectilinear image, wherein the first rectilinear image corresponds to the first portion of the fisheye image when viewed from a first perspective of a first virtual camera;
    applying a second lookup function to a second portion of the fisheye image to mitigate the spatial distortions, wherein the second lookup function comprises a second lookup table having second entries that map second pixels in the second portion to a second rectilinear image, wherein the second rectilinear image corresponds to the second portion of the fisheye image when viewed from a second perspective of a second virtual camera; and
    controlling at least one of the vehicle propulsion system, the braking system, or the steering system based upon the first rectilinear image and the second rectilinear image.

9. The autonomous vehicle of claim 8, wherein the first portion and the second portion overlap in part.

10. The autonomous vehicle of claim 8, the acts further comprising:
prior to receiving the fisheye image, generating the first entries of the first lookup table and the second entries of the second lookup table wherein the first entries of the first lookup table and the second entries of the second lookup table are generated based upon parameters of the fisheye lens of the fisheye camera, wherein the first lookup table corresponds to the first perspective of the first virtual camera, wherein the second lookup table corresponds to the second perspective of the second virtual camera.

11. The autonomous vehicle of claim 8, wherein a field of view of the fisheye lens ranges from 100 to 360°, wherein the fisheye image captures an area of a driving environment surrounding the autonomous vehicle that ranges from 100 to 360° with respect the fisheye camera.

12. The autonomous vehicle of claim 8, wherein the memory further stores a computer-implemented machine learning model having learned weights assigned thereto, the acts further comprising:
prior to controlling at least one of the vehicle propulsion system, the braking system, or the steering system, providing at least one of the first rectilinear image or the second rectilinear image as input to the computer-implemented machine learning model, wherein the computer-implemented machine model identifies a maneuver based upon the learned weights and at least one of the first rectilinear image or the second rectilinear image.

13. The autonomous vehicle of claim 12, wherein controlling at least one of the vehicle propulsion system, the braking system, or the steering system based upon the first rectilinear image and the second rectilinear image comprises causing the autonomous vehicle to execute the maneuver.

14. The autonomous vehicle of claim 12, wherein the computer-implemented machine learning model is a deep neural network (DNN).

15. A method executed by an autonomous vehicle, the method comprising:
receiving a fisheye image captured via a fisheye lens of a fisheye camera of the autonomous vehicle, wherein the fisheye image includes spatial distortions;
responsive to receiving the fisheye image:
  applying a first lookup function to a first portion of the fisheye image to mitigate the spatial distortions, wherein the first lookup function comprises a first lookup table having first entries that map first pixels in the first portion to a first rectilinear image, wherein the first rectilinear image corresponds to the first portion of the fisheye image when viewed from a first perspective of a first virtual camera;
  applying a second lookup function to a second portion of the fisheye image to mitigate the spatial distortions, wherein the second lookup function comprises a second lookup table having second entries that map second pixels in the second portion to a second rectilinear image, wherein the second rectilinear image corresponds to the second portion of the fisheye image when viewed from a second perspective of a second virtual camera; and
  executing a maneuver based upon at least one of the first rectilinear image or the second rectilinear image.

16. The method of claim 15, wherein the autonomous vehicle comprises a computer-implemented machine learning model having learned weights assigned thereto, the method further comprising:
prior to causing the autonomous vehicle to execute the maneuver, providing at least one of the first rectilinear image or the second rectilinear image as input to the computer-implemented machine learning model, wherein the computer-implemented machine model identifies the maneuver based upon the learned weights and at least one of the first rectilinear image or the second rectilinear image.

17. The method of claim 16, wherein the autonomous vehicle comprises a vehicle propulsion system, a braking system, and a steering system, wherein the autonomous vehicle controls at least one of the vehicle propulsion system, the braking system, or the steering system to execute the maneuver.

18. The method of claim 15, wherein a first object is in the first portion of the fisheye image, wherein the first portion is in a central region of the fisheye image, wherein the first object in the fisheye image is enlarged relative to a first actual size of the first object in a driving environment of the autonomous vehicle, wherein a second object is in the second portion of the fisheye image, wherein the second portion is in a peripheral region of the fisheye image, wherein the second object in the fisheye image is compressed relative to a second actual size of the second object in the driving environment of the autonomous vehicle.

19. The method of claim 15, further comprising:
prior to receiving the fisheye image, generating the first entries of the first lookup table and the second entries of the second lookup table to wherein the first entries of the first lookup table and the second entries of the second lookup table are generated based upon parameters of the fisheye lens of the fisheye camera, wherein the first lookup table corresponds to the first perspective of the first virtual camera, wherein the second lookup table corresponds to the second perspective of the second virtual camera.

20. The autonomous vehicle of claim 8, wherein the memory further stores a computer-implemented machine learning model, the acts further comprising:
providing at least one of the first rectilinear image or the second rectilinear image as input to the computer-implemented machine learning model, wherein the computer-implemented machine model classifies an object in at least one of the first rectilinear image or the second rectilinear image;
wherein at least one of the vehicle propulsion system, the braking system, or the steering system is controlled based on the object as classified.

* * * * *